Jan. 20, 1942.   J. R. MORRIS   2,270,462
CUTTING MACHINE
Filed March 27, 1940   3 Sheets-Sheet 1

Inventor
JOSEPH R. MORRIS.
By
Frank Fraser
Attorney

Jan. 20, 1942.   J. R. MORRIS   2,270,462
CUTTING MACHINE
Filed March 27, 1940   3 Sheets-Sheet 2

Inventor
JOSEPH R. MORRIS.
By Frank Fraser
Attorney

Jan. 20, 1942.   J. R. MORRIS   2,270,462
CUTTING MACHINE
Filed March 27, 1940   3 Sheets-Sheet 3

Inventor
JOSEPH R. MORRIS.

By Frank Fraser
Attorney

Patented Jan. 20, 1942

2,270,462

UNITED STATES PATENT OFFICE 2,270,462

CUTTING MACHINE

Joseph R. Morris, Toledo, Ohio, assignor to Libbey-Owens-Ford Glass Company, Toledo, Ohio, a corporation of Ohio Application March 27, 1940, Serial No. 326,222

2 Claims. (Cl. 33—27)

The present invention relates to improvements in cutting machines in general and more particularly to a machine for cutting flat sheets or plates of glass or the like.

This invention appertains to that type of cutting machine commonly referred to as a template cutting machine and which is provided with a continuous track template positioned horizontally above the support for the sheets to be cut. Mounted to travel around the track template is a cutting unit provided with a cutting tool adapted to score the sheet as said cutting unit is propelled around said template. The cutting unit is ordinarily provided with two horizontally spaced guide rollers which engage the outer side edge of the template and with a single guide roller engaging the inner side edge of said template; the single guide roller being preferably positioned at a point intermediate the two outer guide rollers. A template cutting machine of this general type is disclosed in Patent No. 2,045,586 issued June 30, 1936.

In glass cutting machines of the above type, it has always been the practice heretofore to locate the cutting tool inwardly of the track template so that the line of cut made by said cutting tool would lie to the inside of said template. When cutting out a relatively large number of plates of glass of the same shape and size, such as the door and window lights or half-windshields of automotive vehicles (and especially when such plates are to be subsequently fabricated into laminated safety glass), it is desirable that two or more plates be simultaneously cut from a single relatively large sheet of glass. This has not been heretofore practical with machines of the above character due to the distance between adjacent cutting tools which results in a relatively large amount of glass waste between adjacent cutting operations or, otherwise stated, between the lines of cut made by adjacent cutting units.

It is the aim of this invention to provide a cutting machine of the above type capable of simultaneously cutting out a plurality of plates of predetermined shape and size from a single relatively large sheet of glass with a minimum amount of waste between adjacent cutting operations.

Another object of the invention is the provision of a machine of the above type embodying two or more track templates arranged side by side and having cutting units associated therewith in such a manner that the lines of cut made by said units will lie to the outside of the templates whereby the lines of cut of adjacent units can be brought as close together as desired to reduce to a minimum the amount of waste glass between adjacent cutting operations.

A further object of the invention is the provision of coacting means on each cutting unit and respective track template for lifting the cutting tool from the glass sheet just before it leaves said sheet at the completion of the cutting operation and for placing it upon the next sheet to be cut slightly inwardly of the edge thereof at the beginning of the cutting operation whereby to prevent chipping or spalling of the sheet edge as well as injury to the cutting tool.

A still further object of the invention is the provision of cutting units of improved structure associated with the track templates in a novel manner.

Other objects and advantages of the invention will become more apparent during the course of the following description, when taken in connection with the accompanying drawings.

In the drawings, wherein like numerals are employed to designate like parts throughout the same:

Figure 1:
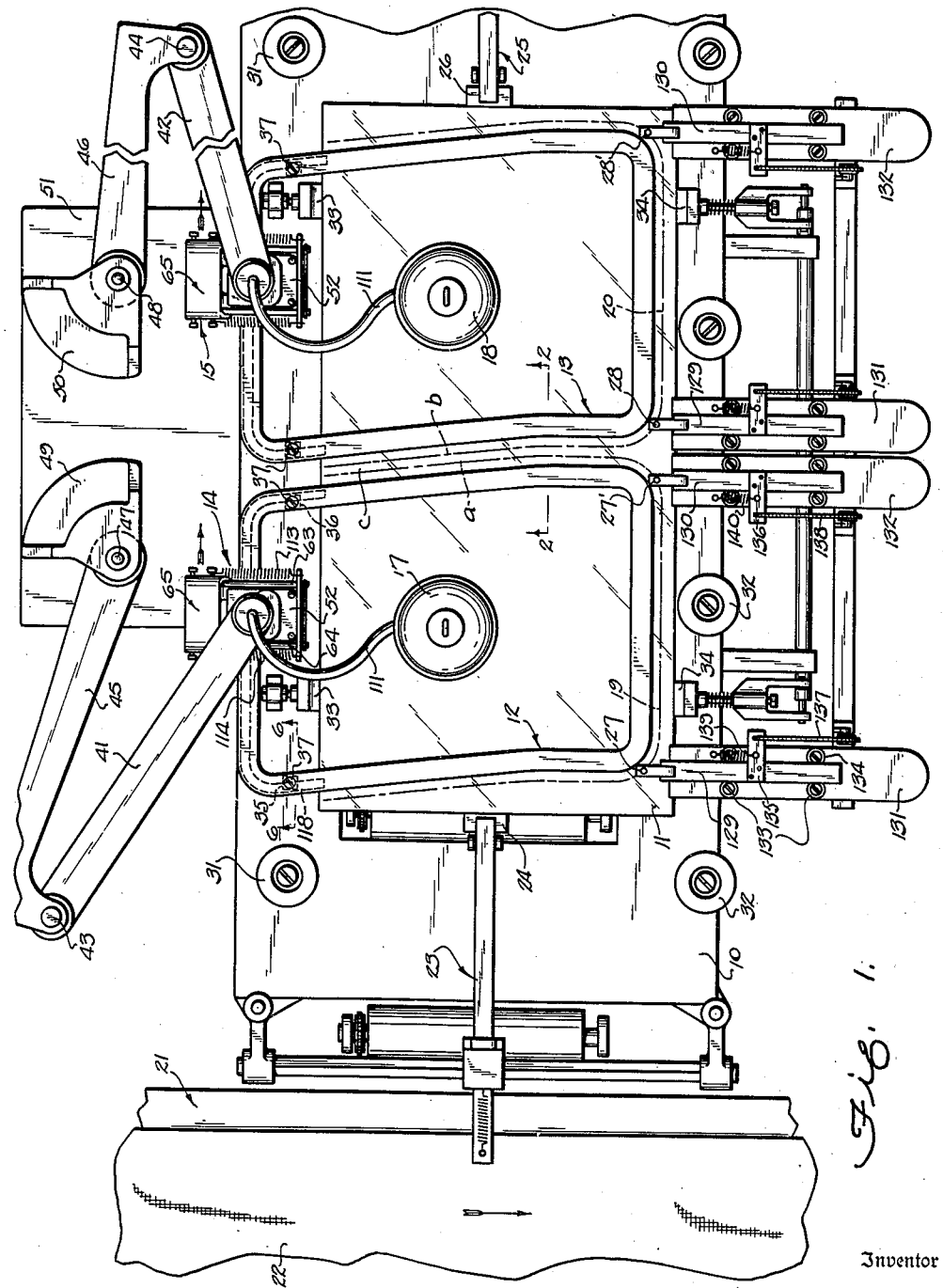
Fig. 1 is a plan view of a cutting machine constructed in accordance with the invention.

The cutting machine of this invention comprises generally a table having a vertically movable top 10 for supporting the sheet of glass or the like 11 during the cutting thereof. Arranged above the table, in vertically spaced relation thereto, are the horizontal track templates 12 and 13 arranged side by side and having the same configuration as the lights or plates to be cut out from the glass sheet 11. Mounted upon the templates 12 and 13 and guided thereby are the power driven cutting units designated in their entirety by the numerals 14 and 15 respectively; each being provided with a rotatable steel cutting wheel 16. The cutting units are adapted to be driven around the templates 12 and 13 by motors 17 and 18 respectively to cause the cutting wheels 16 thereof to score the glass sheet 11 along separate predetermined paths or lines of cut indicated at 19 and 20 respectively.

In this machine, the table top 10 is preferably mounted for vertical movement and after the glass sheet to be cut has been properly located thereon, the said table top is raised to bring the sheet into cutting position. The glass sheet is maintained in elevated position during cutting after which the table top is lowered and the cut sheet discharged therefrom. Upon leaving the cutting table, the sheet is adapted to be received upon a suitable take-off conveyor 21 provided with a traveling surface 22 for supporting the said sheet thereon and carrying it away, preferably at right angles to said table as indicated by the arrow in Fig. 1. The sheet can then be broken along the score lines in any desired manner and by any suitable means.

The glass sheet 11 is fed onto the cutting table from the right hand end thereof, as viewed in Fig. 1, and means is preferably provided for automatically bringing the sheet to a stop when it reaches a predetermined position upon the table and for accurately positioning the said sheet and for preventing accidental displacement thereof during cutting. For this purpose, there is provided at the discharge end of the cutting table the sheet stop means designated generally by the numeral 23 and comprising a block 24 engageable by the forward edge of the glass sheet for limiting the forward movement of the said sheet and for bringing it to a stop when it reaches a predetermined position thereon. In order to prevent undue rebound of the glass sheet when the forward edge thereof engages the stop means 23, there is provided at the opposite end of the cutting table the stop means 25 including a block 26 adapted to engage the rear edge of the sheet after said sheet has passed therebeneath. For a more detailed disclosure of the construction and operation of the stop means 23 and 25 reference may be had to Patent No. 2,118,170, issued May 24, 1938.

When the glass sheet 11 is moved onto the cutting table 10 it is received between and guided forwardly into cutting position by the two series of rollers 31 and 32 disposed adjacent the rear and front edges respectively of the table. When it reaches cutting position between the stop means 23 and 25, the sheet is clamped in place between the fixed clamping blocks 33 arranged at the back of the table and the movable clamping blocks 34 disposed at the front of the table. The table top 10 is then elevated as explained above and the cutting units 14 and 15 propelled around the templates 12 and 13 to simultaneously score the glass sheet 11 along the separate predetermined paths 19 and 20 respectively. Upon completion of the cutting operation the table top is lowered and the cut sheet discharged therefrom.

Figure 7:
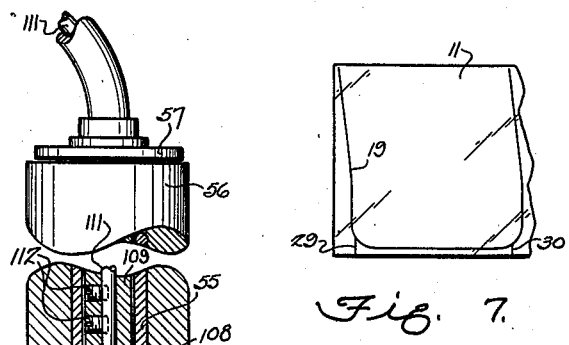
Fig. 7 is a view of a sheet of glass showing the entering cuts.
Figure 2:
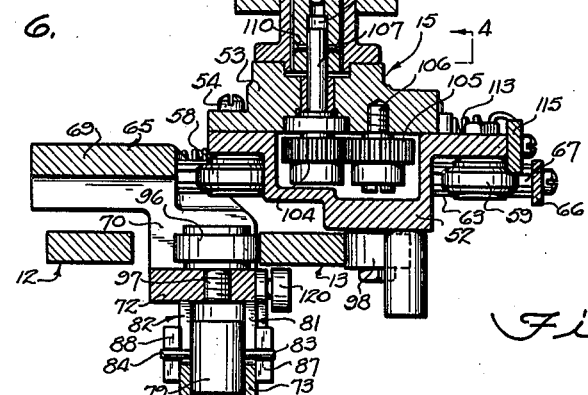
Fig. 2 is a vertical section through one of the cutting units taken substantially on line 2—2 of Fig. 1.

To facilitate the subsequent breaking of the glass sheet 11 along the lines of cut 19 and 20, it is preferred that so-called entering cuts or vents be made in the glass which extend from the front edge of the sheet inwardly to the score lines 19 and 20 made by the cutting units 14 and 15. These entering cuts are formed by the two pairs of cutters 27—27' and 28—28' associated with the templates 12 and 13 respectively. The two entering cuts made by each pair of cutters 27—27' and 28—28' are shown at 29 and 30 in Fig. 7.

Figure 6:
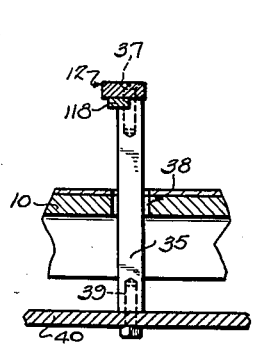
Fig. 6 is a detail vertical section showing the way in which the track templates are mounted in place.

The templates 12 and 13 for the cutting units 14 and 15 respectively consist of relatively narrow continuous tracks of the desired shape and size mounted horizontally above the cutting table 10. Each template 12 and 13 is supported by a pair of vertical posts 35 and 36 arranged at opposite sides and adjacent the back thereof (Fig. 1). Each supporting post 35 and 36 is secured at its upper end to the bottom of the respective template by a screw or the like 37 and passes downwardly through an opening 38 in the table top 10 (Fig. 6) being secured at its lower end by a screw or the like 39 to a fixed horizontal support 40 which may constitute a part of the table structure. By supporting the templates in this manner, the table top 10 can be raised and lowered while the templates are maintained stationary. Likewise, the posts 35 and 36 serve to properly locate and support the templates without in any way interfering with the passage of the glass sheets onto and from the cutting table or the travel of the cutting units around the templates.

As shown in Fig. 1, the cutting units 14 and 15 are carried at the outer ends of horizontal supporting arms 41 and 42 respectively hinged at their inner ends as at 43 and 44 to horizontal arms 45 and 46 which are in turn pivotally mounted at their inner ends as at 47 and 48 to brackets 49 and 50 respectively mounted upon a platform 51. When the cutting units 14 and 15 are in inoperative position at the back of the cutting table as illustrated in Fig. 1, the pair of arms 41, 45 are oppositely arranged with respect to arms 42, 46 so that as the cutting units travel in the same direction around the templates as indicated by the arrows the supporting arms for the two units will in no way interfere with one another.

Inasmuch as the cutting units 14 and 15 are of the same construction and are associated with the templates 12 and 13 in the same manner, a detailed description of only one will be given. Each cutting unit comprises a housing 52 provided with a removable top plate 53 secured in place by screws or the like 54. Fastened to the top plate 53 of housing 52 by screws or the like is a vertical bushing 55 which is rotatably mounted in a bearing sleeve 56 formed at the outer end of the respective horizontal supporting arm 41 or 42. The bushing 55 projects above the bearing sleeve 56 and has threaded thereon a nut 57 which serves to secure the cutting unit to the supporting arm 41 or 42.

Carried by the housing 52 at one side thereof are the spaced guide wheels 58 and 59 freely rotatable upon vertical pins 60, while a pair of similar guide wheels 61 are carried at the opposite side of said housing upon vertical pins 62. The housing 52 is slidably received between a pair of horizontal parallel rods 63 and 64 carried at one end by the cutter head 65 and connected together at their opposite ends by a cross strap 66. The inner sides of the rods 63 and 64 are preferably cut away as indicated at 67 and 68 (Fig. 4) to provide grooved tracks for the guide wheels 58, 59, and 61 respectively.

The cutter head 65 comprises a substantially horizontal body member 69 having formed integral therewith adjacent its opposite ends the depending foot portions 70 and 71. Extending between the foot portions 70 and 71 and secured to the bottom surfaces thereof is a horizontal plate 72. Secured to the bottom of the plate 72 is a cutter block 73 formed with the reduced end portions 74 and 75 through which pass screws 76 and 77 for fastening said cutter block to said plate. The cutter block 73 is provided intermediate its ends with a vertical opening or bore 78 in which is received a cylindrical cutter holder 79; said cutter holder being provided with a depending part 80 projecting beyond said cutter block and carrying the rotatable steel cutting wheel 16.

Figure 3:
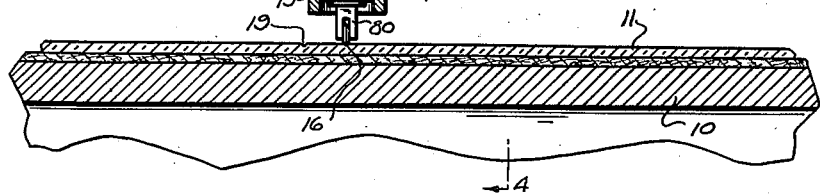
Fig. 3 is a horizontal section taken substantially on line 3—3 of Fig. 4.
Figure 3:
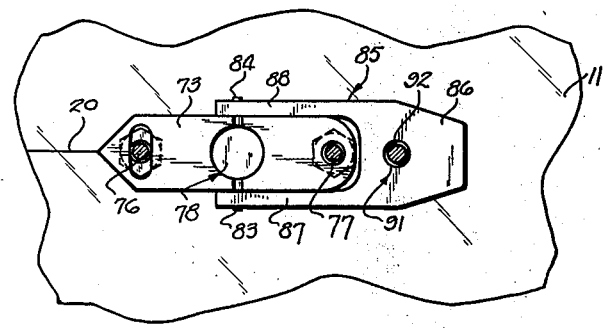
Figure 4:
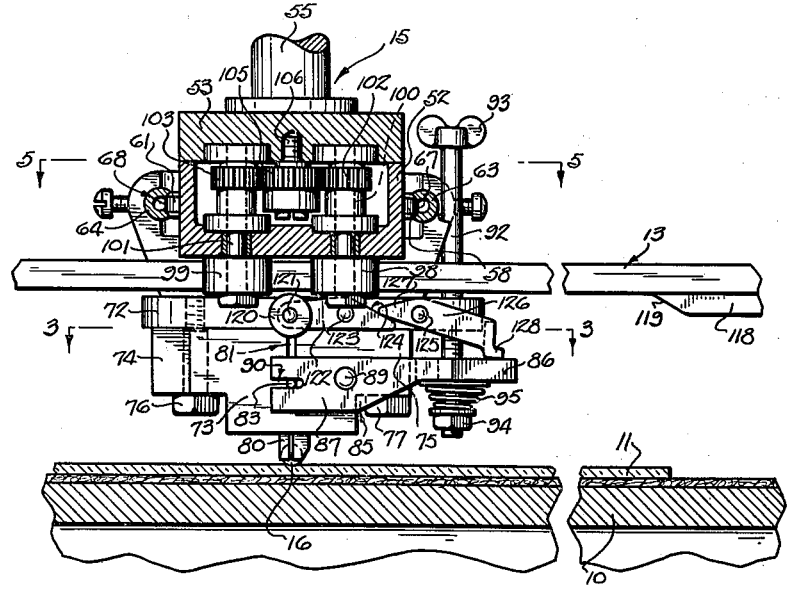
Fig. 4 is a vertical section through the cutting unit taken substantially on line 4—4 of Fig. 2.

The opposite side walls of the cutter block 73 opposite the opening 78 therein are provided with aligned vertical slots 81 and 82 and carried by the cutter holder 79 are horizontal pins 83 and 84 which project outwardly through the said slots 81 and 82 respectively. The numeral 85 (Fig. 3) designates a horizontal substantially U-shaped cutter actuating member having a body portion 86 at one end from which extend the spaced legs 87 and 88 disposed at opposite sides of the cutter block 73 and pivoted thereto intermediate their ends as at 89 (Fig. 4). Each leg 87 and 88 is formed at its outer end with a horizontal slot 90 for receiving the respective pin 83 or 84 therein.

Passing loosely through an opening 91 in the body portion 86 of actuating member 85 is the lower end of a vertical rod 92; said rod being threaded through the adjacent end of the plate 72 and provided at its upper end with a finger grip 93 to facilitate manual rotation thereof. Carried upon the lower end of the rod 92 is a nut 94 and encircling said rod between the nut 94 and actuating member 85 is a compression spring 95; said spring acting to normally rock the actuating member 85 about its pivot 89 in a counter-clockwise direction to urge the cutting wheel 16 downwardly into cutting position. The spring 95 serves to hold the cutting wheel 16 in yieldable engagement with the glass sheet to facilitate the scoring thereof, while the pressure of the cutting wheel upon the glass can be properly regulated by adjustment of the rod 92 to control the compression of the spring 95.

Carried by the cutter head 65 and positioned to engage the outer side edge of the respective template is a freely rotatable guide roller 96 mounted upon a vertical stub shaft 97 secured to the plate 72 intermediate the foot portions 70 and 71 thereof. Carried by the housing 52 and positioned to engage the inner side edge of the template are the spaced guide rollers 98 and 99, the guide roller 96 engaging the template at a point intermediate the two guide rollers 98 and 99. The guide rollers 98 and 99 are positively driven and to this end are carried at the lower ends of vertical drive shafts 100 and 101 respectively journaled in the bottom of housing 52. Keyed to the upper ends of shafts 100 and 101 within housing 52 are gears 102 and 103 respectively.

Figure 5:
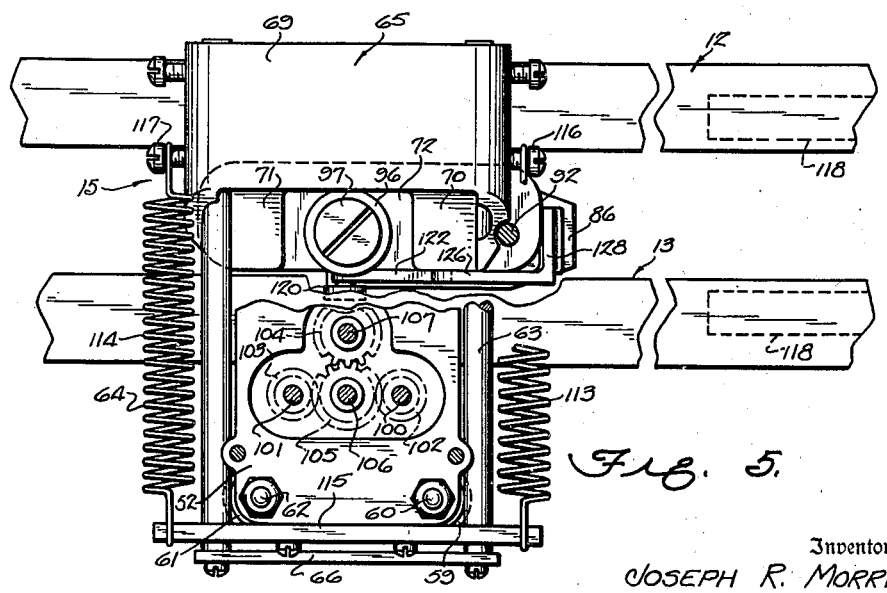
Fig. 5 is a horizontal section taken substantially on line 5—5 of Fig. 4.

The guide rollers 98 and 99 are driven through a train of gears arranged in the housing 52 and including a drive gear 104 and an intermediate gear 105. The intermediate gear 105 is located between the gears 102 and 103 as shown in Fig. 5 and is rotatable upon a vertical screw 106 threaded in the top 53 of housing 52. The drive gear 104 is keyed to the lower end of a vertical stub shaft 107 received at its upper end within a vertical bore 108 formed in a cylindrical bearing 109 arranged within the bushing 55; said bearing 109 being secured to the upper end of the stub shaft 107 by screws or the like 110.

Also received within the bore 108 of bearing 109 is one end of a flexible shaft 111 secured to said bearing by set screws or the like 112. The flexible shaft 111 is connected at its opposite end with the respective motor 17 or 18 which may be suspended a suitable distance above the cutting table or mounted in any other desired manner. Upon operation of the motor, the flexible shaft 111 turning bearing 109 will effect rotation of drive gear 104 and this rotary movement will be transmitted through the intermediate gear 105 to the gears 102 and 103 of the guide rollers 98 and 99. The positive rotation of the guide rollers 98 and 99 will of course propel the cutting unit around the template.

It is necessary in the operation of the machine that the cutting edge of the rotatable steel cutting wheel 16 be always maintained tangent to the line of cut if a satisfactory cut is to be made and the same is equally true if a cutting diamond is used in place of the rotatable steel wheel. The provision of the guide rollers 96, 98, and 99 serves to maintain the cutting edge of the cutting wheel tangent to the line of cut as the cutting unit is propelled around the template.

The guide rollers 96 and 98—99 are yieldably maintained in engagement with the opposite side edges of the template by the action of tension springs 113 and 114 connected at one end to a transverse strip 115 carried at the outer end of housing 52 and at their opposite ends to screws or the like 116 and 117 respectively carried by the cutter head 65. These springs serve to draw the housing 52 and cutter head 65 toward one another to maintain the guide rollers carried thereby in yieldable engagement with opposite sides edges of the template.

By providing cutting units of the above construction and arrangement and in associating them with the track templates in the manner disclosed, it will be seen that the cutting wheels 16 of the cutting units are disposed outwardly of the templates rather than inwardly thereof as has always been the practice in the past. Because of this, the templates 12 and 13 can be arranged side by side in such relation that the lines of cut 19 and 20 of adjacent cutting units can be brought as close together as desired in order to reduce to a minimum the amount of glass therebetween which, upon breakage of the sheet along the score lines, becomes waste. More specifically, upon reference to Fig. 1, it will be noted that the adjacent side portions a and b of the lines of cut 19 and 20 made by the cutting units 14 and 15 are relatively close together so that only a very narrow strip of glass c therebetween is wasted. The width of this strip a could be further reduced by positioning the templates even closer together but a relatively narrow strip of glass as shown is preferred in order to facilitate the subsequent breaking of the glass along the score lines. Thus, by associating the cutting units 14 and 15 with the templates 12 and 13 in such a way that the lines of cut made by the cutting wheels 16 lie to the outside of the templates, two lights or plates can be simultaneously cut from the single sheet of glass 11 with a minimum amount of waste glass between adjacent cutting operations. Obviously, the waste strip of glass c would be much wider if the lines of cut 19 and 20 were disposed inwardly of the templates. Of course, more than two templates and associated cutting units can be arranged side by side as shown depending upon the number of plates it is desired to cut from the glass sheet 11.

For the purpose of preventing chipping or spalling of the rear edge of the glass sheet 11 as the cutting wheels 16 of the cutting units pass onto the sheet at the beginning of the cutting operation and from said sheet at the completion of the cutting operation as well as for preventing injury to the cutting wheels, means is provided for lifting each cutting wheel and placing it upon the sheet slightly inwardly of the rear edge thereof at the beginning of the cutting operation and for also lifting the cutting wheel from the sheet just before it reaches the rear edge at the completion of the cutting operation. This raising and lowering of the cutting wheels is effected by cam members 118 carried by the templates 12 and 13 in conjunction with coacting means carried by the cutting units 14 and 15. Each cam member 118 is in the form of a metal strip secured to the under surface of the template and arranged along the back of the cutting table as indicated in dotted lines in Fig. 1, said strip having its opposite end portions directed forwardly and beveled as shown at 119 in Fig. 4.

Carried by the inner side edge of the plate 72 of each cutting unit is a roller 120 rotatable freely upon a pin 121 secured at one end of a lever 122; said lever being pivoted intermediate its ends as at 123 and having its free end beveled as at 124. Also pivoted to the plate 72 as at 125 is a second lever 126, the forward end 127 of which engages the beveled end 124 of lever 122, while the opposite end 128 thereof bears upon the outer end 86 of the cutter actuating member 85. During the cutting operation, the compression spring 95 serves to force the outer end of member 85 upwardly about its pivot 89 to urge the cutting wheel 16 downwardly and maintain it in yieldable engagement with the glass sheet. At this time, the lever 126 is rocked in a counter-clockwise direction upon its pivot 126 and the lever 122 in a clockwise direction about its pivot 123 to urge the roller 120 upwardly. However, at the completion of the cutting operation and just before the cutting wheel 16 reaches the back edge of the glass sheet 11, the roller 120 engaging cam member 118 will be moved downwardly thereby rocking the lever 126 in a clockwise direction to force the outer end 128 thereof downwardly against member 85 and rock said member in a clockwise direction upon its pivot 89 to raise the cutting wheel 16 from the glass. The cutting wheel will be maintained in elevated position by the cam member 118 until the roller 120 passes therefrom at the beginning of the next cutting operation to place the cutting wheel upon the sheet just inwardly of the back edge thereof.

In the operation of the machine, the table top 10 is first moved to lowered position and the glass sheet 11 to be cut then moved forwardly upon the table from right to left in Fig. 1 between the guide rollers 31 and 32. When the glass sheet is properly located between the stop means 23 and 25 the table top is raised and the sheet clamped in fixed position between the fixed and movable clamping blocks 33 and 34. At this time, the cutting units 14 and 15 are positioned at the back of the table as shown in Fig. 1, while the cutters 27—27' and 28—28' for making the entering cuts 29 and 30 are also in the position shown in Fig. 1. The motors 17 and 18 are then placed in operation to propel the cutting units 14 and 15 around the templates 12 and 13 and to effect the simultaneous scoring of the glass sheet along the lines 19 and 20. When the cutting units have substantially completed their cutting cycle, the cutters 27—27' and 28—28' are moved outwardly to produce the entering cuts 29 and 30. After the glass sheet has been properly scored by the cutting units and also by the entering cutters, the table top 10 is lowered and the scored sheet discharged therefrom onto the take-off conveyor 21. To permit the discharge of the sheet from the cutting table, the stop block 24 is temporarily raised to allow the passage of the sheet therebeneath.

The particular construction and operation of the entering cutters 27—27' and 28—28' form no part of the present invention per se and are more fully illustrated, described, and claimed in the copending application of Joseph R. Morris, filed September 25, 1939, Serial No. 296,444. Briefly, however, each pair of entering cutters 27—27' and 28—28' are carried at the forward ends of horizontal slide plates 129 and 130 slidably mounted upon the fixed supporting plates 131 and 132 respectively; each slide plate being guided in its movement between two pairs of rollers 133 and 134 on said plates 131 and 132. Secured to the slide plates 129 and 130 are transverse strips 135 and 136 respectively to which are attached chains 137 and 138; said chains being connected at their opposite ends with solenoids or other suitable electrical or mechanical actuating means for drawing the slide plates 129 and 130 outwardly to effect the making of the entering cuts 29 and 30 at the proper time in the operation of the machine. The entering cutters are normally urged inwardly to the position shown in Fig. 1 by springs 139 and 140 secured to the plates 131—132 and transverse strips 135—136.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a machine of the character described for cutting sheets of glass or the like, a vertically movable table for supporting the sheet to be cut, a track template mounted horizontally above said table, a cutting unit mounted to travel around said template and including a cutting tool for scoring the sheet, and supporting means for said template passing downwardly through openings in said table for supporting the said template in fixed position without interfering with the vertical movement of the said table or the travel of said cutting unit around said template.

2. In a machine of the character described for cutting sheets of glass or the like, a vertically movable table for supporting the sheet to be cut, a track template mounted horizontally above said table, a cutting unit mounted to travel around said template and including a cutting tool for scoring the sheet, and vertical supporting posts secured to the under side of said template and passing downwardly through openings in said table for supporting the said template in fixed position without interfering with the vertical movement of the said table or the travel of said cutting unit around said template.

JOSEPH R. MORRIS.